United States Patent
Kluczynski

[11] 3,941,350
[45] Mar. 2, 1976

[54] QUIETING MEANS FOR A FLUID FLOW CONTROL DEVICE USING VORTICAL FLOW PATTERNS

[75] Inventor: Matthew L. Kluczynski, Chatsworth, Calif.

[73] Assignee: The Bendix Corporation, North Hollywood, Calif.

[22] Filed: Mar. 4, 1974

[21] Appl. No.: 447,697

[52] U.S. Cl. .............. 251/127; 138/42; 137/625.37
[51] Int. Cl.$^2$ .......................................... F16K 47/08
[58] Field of Search .................................... 251/127; 137/625.28–625.37; 138/42, 46, 43

[56] References Cited
UNITED STATES PATENTS

| | | | |
|---|---|---|---|
| 3,323,550 | 6/1967 | Lee | 138/43 X |
| 3,513,864 | 5/1970 | Self | 251/127 X |
| 3,780,767 | 12/1973 | Borg | 251/127 X |

Primary Examiner—Henry T. Klinksiek
Attorney, Agent, or Firm—Robert C. Smith; William F. Thornton

[57] ABSTRACT

Quieting means for a fluid flow control device is shown in connection with a typical pressure relief type valve. The quieting means consists of a stack of washer-like members or disks which cooperate to define a large number of finely-divided flow paths across the stack of disks. To provide a configuration which is very economical of space, the disks are arranged such that the flow path turns back and forth through different planes. Groups of flow paths are defined by a number of groups of two or three perforated disks confined between two imperforate disks. In one embodiment, two perforated disks having patterns of small vortical flow directors are positioned on opposite sides of a similar disk having a pattern of small orifices. By proper juxtaposition of the three disks, a circuitous flow pattern is established through a radial passage tangentially into a first vortical chamber defined by a first cylindrically shaped opening in one disk, axially through a small orifice in the orifice disk to a third cylindrically shaped opening and another radial passage arranged to produce an oppositely directed flow pattern substantially radially through said opening and axially in the opposite direction through another small orifice to another such cylindrically shaped vortical chamber and continuing in this manner across the stack of disks. The dimensions of the passageways and orifices are chosen such that the velocity of flow across any orifice never exceeds a desired limit. The pressure drop is shared between the vortical effects and the series orifices whereby the fluid velocity is reduced and controlled. The vortex effect minimizes the approach velocity from one orifice to another. A second embodiment does not use the intermediate orifice plate, but places two similar disks having the vortical flow-directing pattern adjacent to each other but nonaligned such that axial flow occurs through a section where the essentially cylindrical portions of the pattern on the plates are in registry and radial flow occurs along paths leading to and from the cylindrical sections. The radial flow paths are oriented such that a reversal in the vortical flow pattern occurs at the end of each cylindrical pattern.

3 Claims, 9 Drawing Figures

QUIETING MEANS FOR A FLUID FLOW CONTROL DEVICE USING VORTICAL FLOW PATTERNS

BACKGROUND OF THE INVENTION

In a wide variety of applications there is a need for structures to vary the fluid-flow rate of flowing fluids and to control pressure without the production of noise and vibration. The term "throttling" is generally applied to the function of altering or adjusting fluid flow throughout a range of flow rates and is generally associated with reduction in pressure. The various structures by which the function is performed are generally called "throttling valves" to distinguish them from structures whose function is to open and close a flow path as a step function. To the extent that on-off valves are not opened and closed instantaneously, so that throttling noise and vibration may be produced therein at the time of opening or closure, the invention described herein is applicable to such valves as well, and they are included in the term "throttling valve".

A typical control valve for handling the flowing of high pressure fluids employs a structure in which the cross-sectional area of the flow path is altered. This type of structure generally produces substantial noise and vibration and is quite subject to damage from cavitation. However, the structures employed in this arrangement are, as a class, least expensive and most conveniently employed. in general the noise, vibration and cavitation generated in orificial valves is an incident to the Venturi effect which attends movement of the fluid through the orificial opening. When the orifice has reduced cross-sectional area, or is throttled, fluid velocity is increased, and its pressure energy is reduced. The energy difference results in turbulence following the orifice where it is transformed into acoustic energy in the form of noise transmitted through the fluid and in vibration in the surrounding structure, some of which occurs at audible frequency. In extreme cases involving liquids, the turbulence results in localized pressure reductions downstream from the orificial restriction sufficient to form vapor spaces or pockets. The vapor in these spaces is returned to liquid as the vapor bubble is imploded by the pressure of the medium surrounding the bubble. This phenomenon is called cavitation and results in noise and occasional erosion of adjacent surfaces of the valve structure. It will be appreciated that there are many applications for which it is desired to substantially reduce both the noise and the effects of cavitation in operation of valves. A similar useful effect is produced when the resulting noise is of a magnitude and frequency such that it is not readily transmitted to or through the surrounding structure.

There have been many structures devised in an attempt to deal with the noise, vibration and possible cavitation resulting from operation of valves in high pressure systems. Most of these have involved some form of baffling means which operate in one way or another to divide the flow into finely divided streams. One such arrangement involves creating a baffle consisting of a number of successive layers of fine screen-like material which are held tightly together and preferably brazed since it is necessary to avoid mechanical vibration of the parts. Another type of structure which has been proposed and used to some extent includes baffles or sleeves of sintered metal. Both of these latter arrangements have proved unsuccessful for severe applications in that the amount of quieting provided is insufficient and, in the case of the sintered elements, there is some inconsistency in structure which makes the results somewhat unpredictable. Another type of structure which has been used consists of a stack of disks having tortuous passageways etched on adjacent surfaces to thereby provide a large number of discrete flow paths with many turns as a means of frictionally inhibiting the flow across the stack. This arrangement can provide good quieting, but since it relies essentially on frictional losses, performance is quite susceptible to viscosity changes which are an inherent result of temperature changes.

DESCRIPTION OF THE PREFERRED EMBODIMENT

Figure 1:
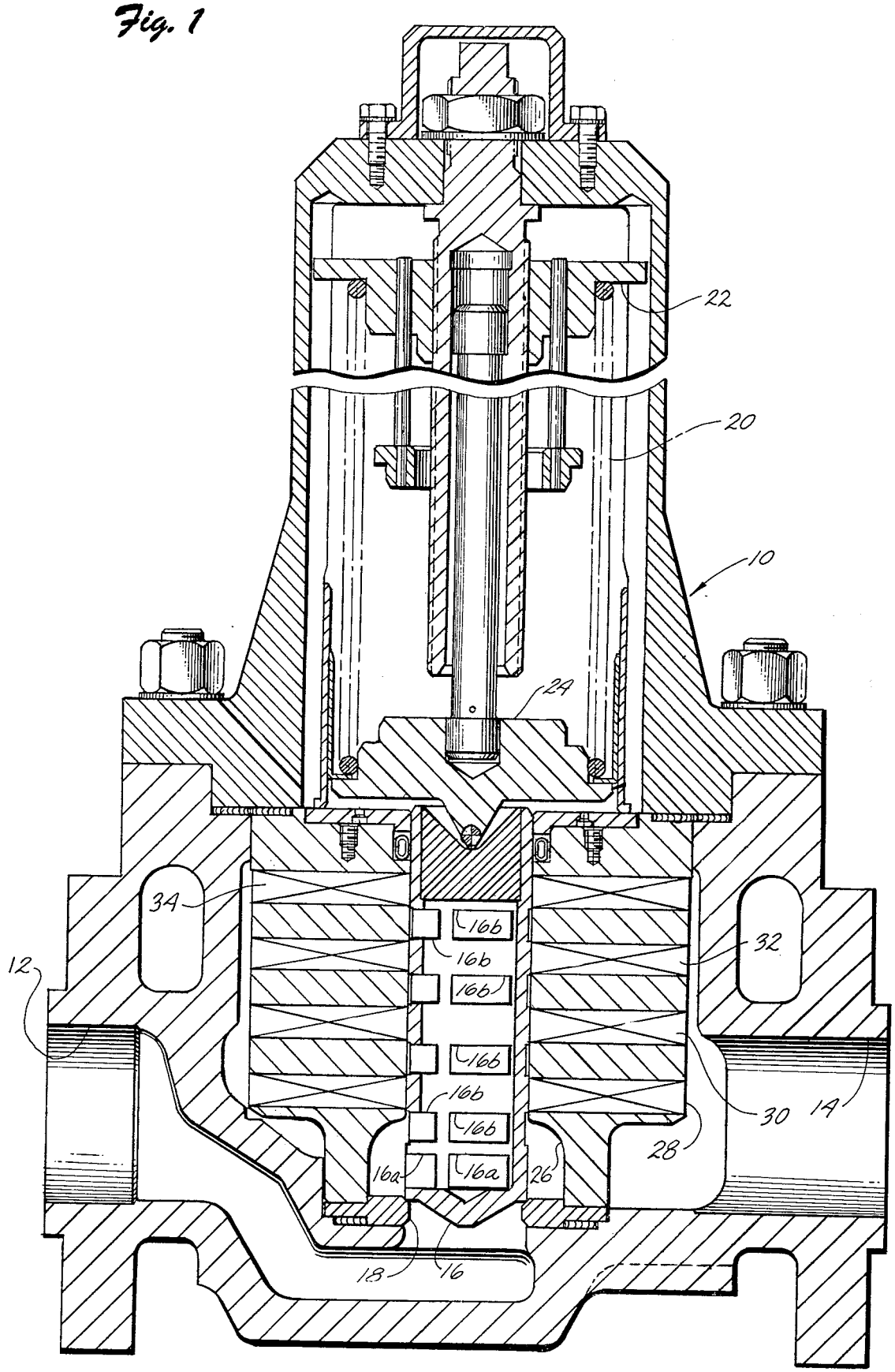
FIG. 1 is a cross-sectional view of a valve using my invention.

Referring now to FIG. 1, a form of relief valve used as a back pressure regulator is shown generally at numeral 10 having an inlet passage 12 and an outlet passage 14. A poppet valve member 16 is urged against a seat 18 by means of a spring 20 held between retainer members 22 and 24. Poppet valve member 16 includes a plurality of openings 16a which permit flow into its hollow interior from a chamber 26 downstream of seat 18. As poppet valve 16 moves upwardly, greater amounts of registry will occur between other openings 16b in its side wall and a plurality of groups of quieting elements 28, 30, 32 and 34. Each group consists of a stack of disks or washer-like elements which are positioned relative to each other such that a number of finely divided flow paths permit flow from inside to outside across the disks. The disk structure and flow pattern are described in detail below. As the fluid flows across the stacks, it reaches outlet passage 14 from whence it will normally flow to a low pressure source, such as to a reservoir or the inlet side of a pump.

Those skilled in the art will recognize that if the valve 10 operates to hold fluid pressure at a fairly high level and then suddenly vents fluid to a substantially lower pressure, there will be a tendency for operation of the poppet valve 16 to be accompanied by a loud noise and, possibly, cavitation. In the arrangement shown, however, the resulting flow is divided into many fine parallel flow paths each having structure giving rise to numerous pressure drops, all of which are limited to pressure differentials such that the noise across each pressure drop is very slight. At the same time the control of pressure differentials results in avoiding cavitation with the usual damage to valve and seat structure.

Figure 2:
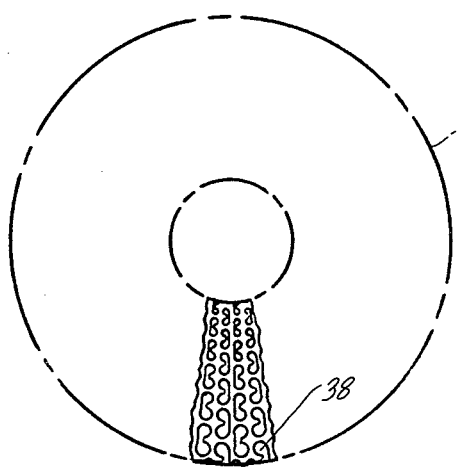
FIG. 2 is a plan view of one of a first group of quieting elements showing the pattern of elongated passages therethrough for directing flow into vortical flow patterns.
Figure 3:
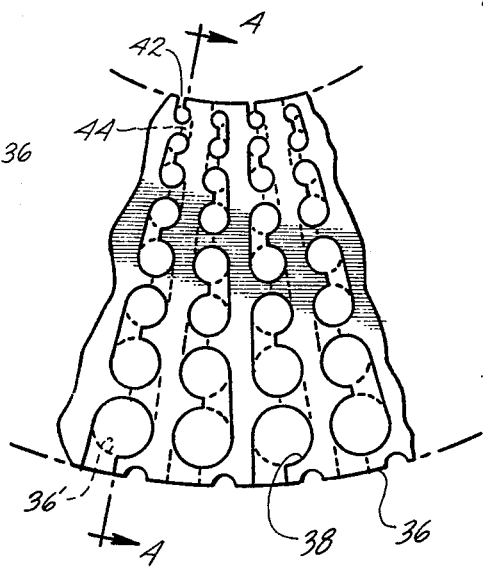
FIG. 3 is an enlarged, fragmentary view of a stack of quieting elements such as those of FIG. 2.

Details of the disk structure appear in FIGS. 2–9. FIG. 2 is a plan view of a typical disk 36 used to produce the desired vortical flow characteristic. It will be observed that each such disk 36 includes a plurality of radially aligned ports 38 whose shape is such as to cause fluid flow moving radially to be directed into a vortical pattern. A better understanding of the flow pattern across a stack of disks 36 may result from consideration of FIGS. 3 and 4. FIG. 3 is an enlarged view of segments of two disks like disk 36 which are juxtaposed in such manner as to define many flow paths from inside to outside. The upper disk 36 is positioned relative to the lower disk 36' such as to define a number of radial flow paths. Each pair of disks 36, 36' is compressed between a pair of solid or blank disks 40 as shown in the sectional view, FIG. 4. Since the ports increase in area from inside to outside, it is apparent that the arrangement shown is primarily for controlling the flow of gases which expand in volume as pressure is reduced. High pressure fluid on the inside of the disk will flow into a port 42 where it is directed tangentially against the side wall of a cylindrical chamber into a swirling pattern and is then directed axially into a similar cylindrical chamber defined by a port in disk 38'. Here it is redirected radially along a passage 44 to the next cylindrical chamber where the flow is again redirected into a vortical flow in the opposite direction from that previously created. As a result of this repeated direction into vortical flow and with changes in flow direction each time, the fluid flow pattern is subjected to measurable and predictable pressure drops at each stage which operate to decrease pressure, but at an amount which does not give rise to substantial noise.

Figure 4:
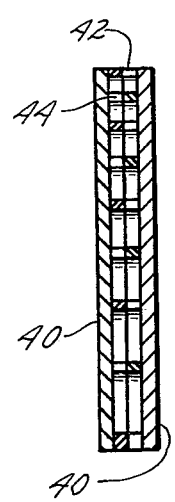
FIG. 4 is a sectional view taken along line 4—4 of FIG. 3 through one group of quieting elements as shown in FIG. 2, including blank disks and showing the flow path thereacross.
Figure 8:
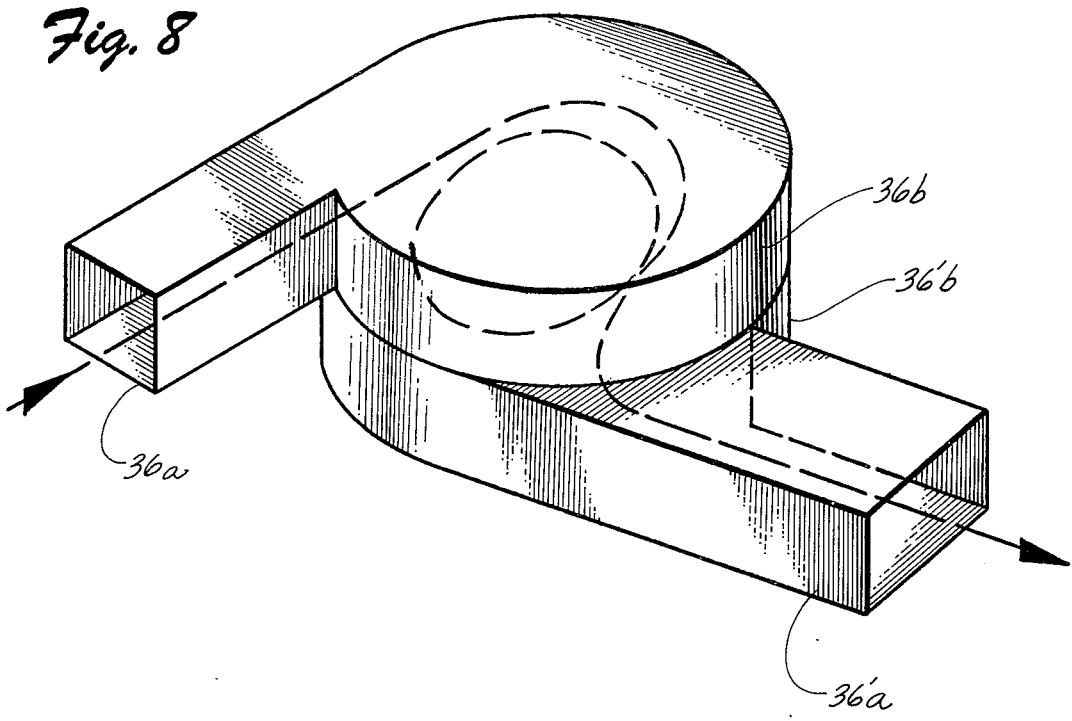
FIG. 8 is an enlarged schematic representation of a single quieting stage of the type shown in FIGS. 3 and 4.

The particular flow pattern in the arrangement of FIGS. 3 and 4 is shown in FIG. 8 in much larger scale. Flow into an inlet 36a of small effective area is directed tangentially into a cylindrical chamber 36b, 36'b where it is given a vortical flow pattern. As it approaches the outlet 36'a, it is constrained to change direction as shown before exiting to the next stage where the pattern is essentially the same, but the vortical flow will be in the opposite direction. Each stage is somewhat larger in volume to accommodate the larger volume of gaseous flow as the gas expands with successive stages.

Figure 5:
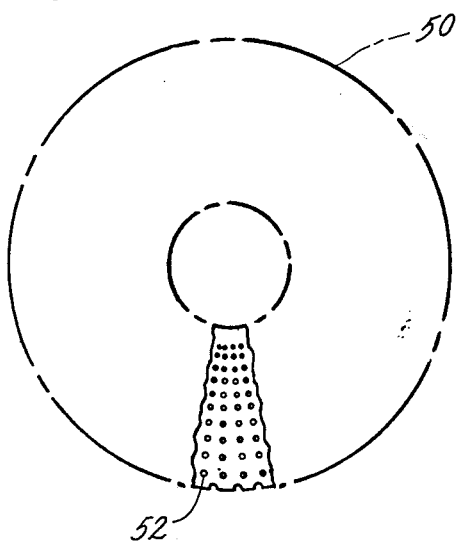
FIG. 5 is a plan view of one of a second group of quieting elements showing the pattern of orifices therethrough.
Figure 6:
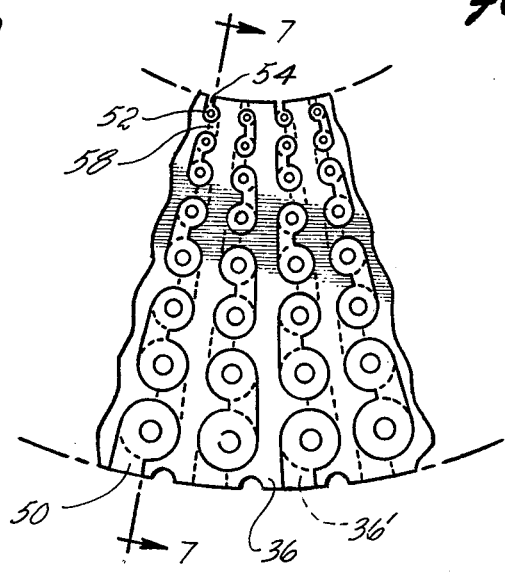
FIG. 6 is an enlarged fragmentary plan view of a stack of quieting elements including an orifice disk like that of FIG. 5 positioned between two disks like that of FIG. 2.
Figure 7:
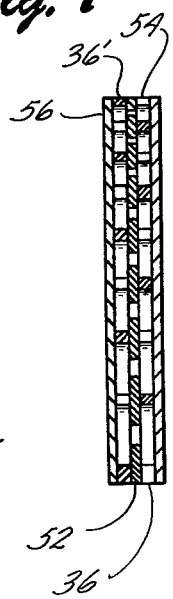
FIG. 7 is a sectional view taken along line 7—7 of FIG. 6 through one group of quieting elements including blank disks and showing the flow path thereacross.
Figure 9:
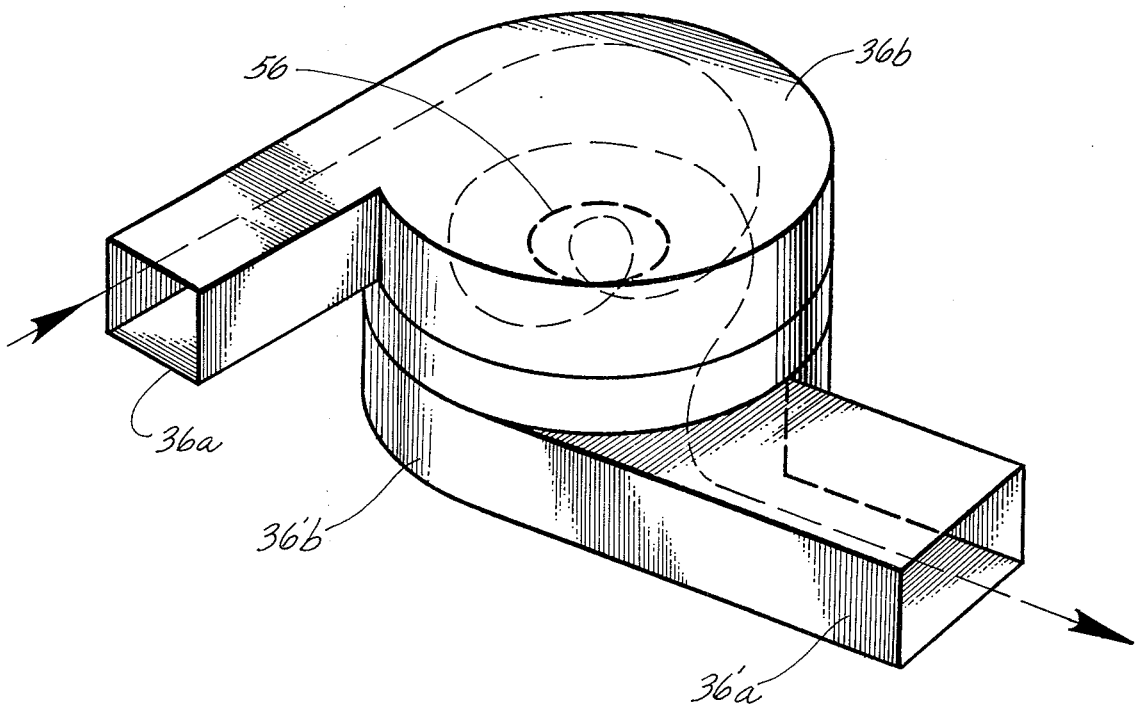
FIG. 9 is an enlarged schematic representation of a single quieting stage of the type shown in FIGS. 6 and 7.

In another embodiment described with the aid of FIGS. 5, 6 and 7, the vortical flow pattern is modified by means of an orificial pressure drop across an orifice plate shown at numeral 50 in FIG. 5. This plate contains a plurality of orifices 52 which are positioned between the plates 36, 36' with the orifices in registry with the centers of the cylindrical vortical flow chambers. This arrangement is shown in detail in FIGS. 6 and 7 wherein flow, as above, enters at a port 54 on the inside diameter of a disk 36 and is directed into a vortical pattern, flows through an orifice 52 in plate 50 and into a corresponding cylindrical section of a port 58 in plate 36'. The fluid then flows along the radially oriented part of port 58 and into the next cylindrical vortical section. Thus the flow is through a port into a vortical chamber in plate 36, across an orifice 52 in orifice plate 50 into a vortical chamber port in plate 36', across another orifice to plate 36, etc. (See FIG. 7). This flow pattern may be better understood from consideration of FIG. 9 wherein the scale has been enlarged sufficiently to show certain detail not possible in FIGS. 5, 6 and 7. In FIG. 9 the flow pattern consists of an inlet 36a of comparatively small area directing flow tangentially into a cylindrical portion 36b wherein a spiral flow pattern is created and which flow is then directed through an orifice 56 of comparatively small area. After passing orifice 56, flow passes into another cylindrical chamber 36b where it tends to flow spirally but is forced to change direction and flow out of outlet 36'a which has a somewhat larger area than inlet 36a. Thus the fluid pressure is subjected to modification because of the drop across orifice 56 and because of the vortical flow pattern which is continually reversed in direction on the downstream side of the orifice. In one configuration which applicant has tested, it was found that approximately half of the pressure modification was attributable to each of these effects, although the proportion may be changed with changes in dimensions of the respective passages, chambers and orifices.

It will be apparent that many modifications may be made within the scope of the present invention. Obviously, the patterns of the ports in the disks may be reversed where necessary so that the flow is from outside to inside, although where gas expansion must be provided for this is less efficient in terms of the number of flow paths which can be accommodated within specific dimensions. The numbers of groups of disks used will depend upon the requirements of the given installation, and the number of pressure drop stages across the disks will vary with the requirements for low noise. Thus it may appear that, for a given installation requiring very quiet operation, no less than five or six rows of interconnected ports (across the disks) will be required, whereas a requirement for protection from cavitation and a lower noise reduction may be satisfied by disks having only two or three such rows of ports (stages). And while the disks have been described in terms of groups of two or three separated by imperforate disks, it is apparent that discrete flow paths can be maintained without separating the groups with imperforate disks if the patterns are adjusted radially to avoid intercommunication. While a simple relief valve has been shown incorporating by invention, many kinds of valves, especially spool or piston-type valves, may be usefully combined with the quieting disk arrangement to effect quieter operation and to avoid or minimize valve wear due to cavitation.

I claim:

1. In a flow path including an entry opening to said flow path:
   a valve means for closing said opening in variable degrees;
   a means for controlling the flow through said opening comprising a stack of laminar members across said opening having abutting faces, including a first group of members having elongated passageways therethrough each of said passageways defining a substantially cylindrical chamber and a radially directed passage intersecting said cylindrical chamber tangentially, with adjacent pairs of said first group being positioned radially such that the cylindrical chambers in said adjacent members are axially aligned and vortical flow patterns are produced in said chambers, but with the said radially directed passages being connected oppositely to said chambers to produce reversals in direction of flow near the exit of each of said pairs of cylindrical chambers; and a second group of laminar members which have no communication with said chambers and passages and which abut against the opposite faces of said first group of members to confine flow to a plurality of generally serpentine paths across said stack.

2. A valve means as set forth in claim 1 wherein a third group of said members is incorporated which members are substantially thinner than the members of said first and second groups including a single member interposed between two members of said first group, members of said third group having a series of orifices therethrough substantially smaller than said elongated passageways, each of said two members having the axes of its cylindrical chambers in registry with the axes of the orifices in said single members, said passages and cylindrical chambers being of cross-sectional areas substantially exceeding the area of said orifices.

3. A valve means as set forth in claim 2 wherein said opening includes a plurality of parallel paths spaced from each other and sequentially exposed to flow as said valve means opens, each of said paths including a stack of said members.

* * * * *